US010737595B2

(12) United States Patent
Ewel et al.

(10) Patent No.: US 10,737,595 B2
(45) Date of Patent: Aug. 11, 2020

(54) STORAGE FOR SEATING ASSEMBLY

(71) Applicant: Ford Global Technologies, LLC, Dearborn, MI (US)

(72) Inventors: Adam Ewel, Royal Oak, MI (US); Corbin Johnston, Winnipeg (CA); Johnathan Andrew Line, Northville, MI (US); Marcos Silva Kondrad, Macomb Township, MI (US); Gregory Hagedorn, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 15/949,290

(22) Filed: Apr. 10, 2018

(65) Prior Publication Data
US 2019/0308533 A1    Oct. 10, 2019

(51) Int. Cl.
*B60N 2/36* (2006.01)
*B60N 2/30* (2006.01)

(52) U.S. Cl.
CPC .............. *B60N 2/36* (2013.01); *B60N 2/3011* (2013.01)

(58) Field of Classification Search
CPC .......... B60N 2/36; B60N 3/004; B60N 2/686; A47C 7/72; A47C 31/00; A47C 7/628; A47C 7/622; B60R 7/043; B62D 65/14
See application file for complete search history.

(56) References Cited

U.S. PATENT DOCUMENTS

| | | | |
|---|---|---|---|
| 6,059,358 A | 5/2000 | Demick et al. | |
| 6,199,948 B1 | 3/2001 | Bush et al. | |
| 6,702,375 B1 * | 3/2004 | Laskowski | B60N 2/206 273/236 |
| 7,090,274 B1 * | 8/2006 | Khan | B60N 2/36 296/37.14 |
| 7,611,199 B2 * | 11/2009 | Michalak | B60N 2/0232 297/300.2 |
| 8,727,374 B1 * | 5/2014 | Line | B60R 21/207 280/728.3 |
| 9,168,850 B2 * | 10/2015 | Meszaros | B60N 2/90 |
| 9,758,064 B1 | 9/2017 | Dry et al. | |
| 9,834,166 B1 * | 12/2017 | Line | B60R 21/207 |
| 10,428,564 B1 * | 10/2019 | Ewel | E05B 79/20 |
| 2005/0067873 A1 * | 3/2005 | Iyoda | B60N 2/3031 297/378.14 |
| 2005/0161480 A1 | 7/2005 | Tirey | |
| 2005/0248189 A1 | 11/2005 | Prasatek et al. | |

(Continued)

FOREIGN PATENT DOCUMENTS

| | | | | |
|---|---|---|---|---|
| DE | 102009040902 A1 * | 3/2011 | | B60R 5/006 |
| DE | 102011108595 A1 * | 6/2012 | | B60N 2/065 |

(Continued)

*Primary Examiner* — Timothy J Brindley
(74) *Attorney, Agent, or Firm* — David Coppiellie; Price Heneveld LLP

(57) ABSTRACT

A vehicle seating assembly includes a seat and a seatback. The seatback includes a vehicle facing portion. The vehicle facing portion includes a first bracket and a second bracket mounted to a frame and a module mounted to the first bracket and the second bracket. The module includes protrusions that are rotatably coupled to first apertures in the first bracket and a mounting apparatus for securing the module to the second bracket.

27 Claims, 15 Drawing Sheets

(56) References Cited

U.S. PATENT DOCUMENTS

| | | | | |
|---|---|---|---|---|
| 2007/0182230 | A1* | 8/2007 | Bhatia | B60N 2/206 297/378.1 |
| 2008/0252111 | A1* | 10/2008 | Rothkop | B60N 3/004 297/188.04 |
| 2014/0203610 | A1* | 7/2014 | Line | B60N 2/2222 297/354.1 |
| 2014/0265501 | A1* | 9/2014 | Line | B60N 2/0232 297/341 |
| 2015/0001898 | A1 | 1/2015 | Line et al. | |
| 2015/0001899 | A1* | 1/2015 | Line | B60R 7/043 297/188.04 |
| 2015/0145303 | A1* | 5/2015 | Line | B60N 2/643 297/283.3 |
| 2015/0251579 | A1* | 9/2015 | Line | B60N 2/64 297/452.18 |
| 2015/0321614 | A1* | 11/2015 | Line | B60R 7/005 297/188.04 |
| 2016/0046220 | A1* | 2/2016 | Styn | B60N 2/6009 297/452.1 |
| 2016/0236600 | A1* | 8/2016 | Citron | B60N 2/5825 |
| 2017/0036572 | A1* | 2/2017 | Hansen | B60N 2/30 |
| 2018/0065513 | A1* | 3/2018 | Line | B60N 2/3011 |
| 2018/0126886 | A1* | 5/2018 | Line | B60N 2/80 |
| 2018/0361884 | A1* | 12/2018 | Mallette | B60N 2/686 |
| 2019/0210535 | A1* | 7/2019 | Shrewsbury | B60R 7/005 |
| 2019/0225180 | A1* | 7/2019 | Kondrad | B60N 2/686 |

FOREIGN PATENT DOCUMENTS

| | | | | |
|---|---|---|---|---|
| DE | 202018104292 U1 * | 8/2018 | | B60N 2/01 |
| WO | WO-2016030640 A1 * | 3/2016 | | B60N 3/004 |
| WO | WO-2018060203 A1 * | 4/2018 | | B60R 11/0252 |

\* cited by examiner

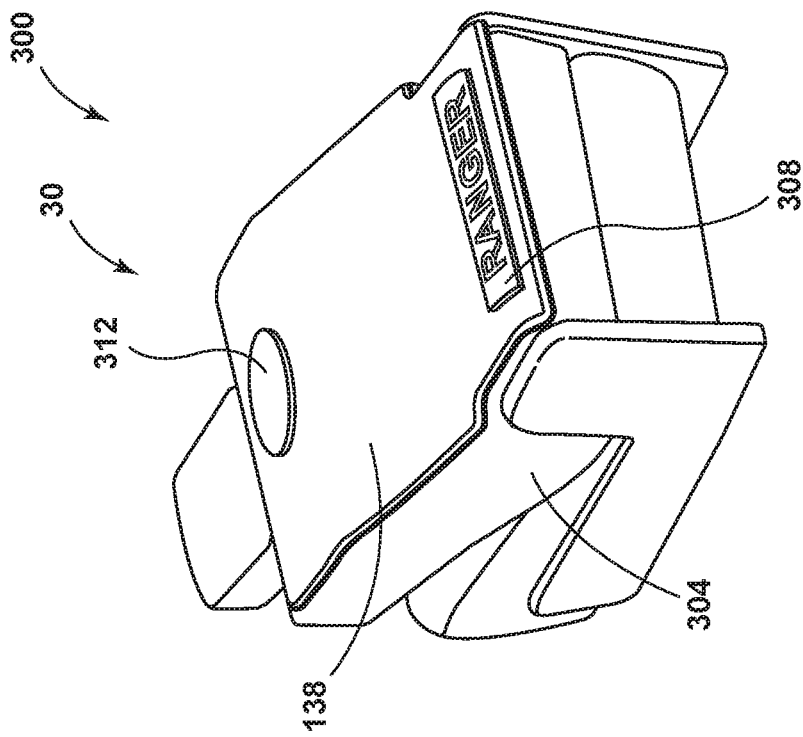
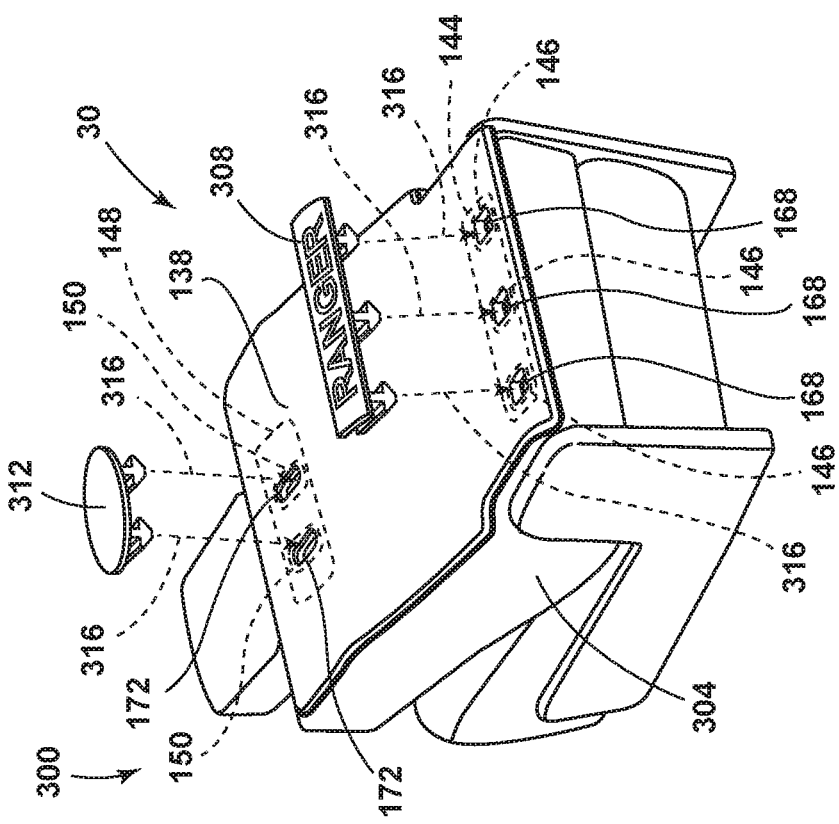

STORAGE FOR SEATING ASSEMBLY

FIELD OF THE DISCLOSURE

The present disclosure generally relates to vehicle seating assemblies, and more particularly to storage areas for vehicle seating assemblies.

BACKGROUND OF THE DISCLOSURE

Seating assemblies typically include a seatback to support a back of an occupant in an upright sitting position and various reclined positions. Similar to other areas of a vehicle interior, such as consoles and door trim panels, seatbacks commonly include storage areas for passenger items. However, improved seatback storage areas for passenger items are always desired.

SUMMARY OF THE DISCLOSURE

According to one embodiment of the present disclosure, a vehicle seating assembly includes a seat and a seatback. The seatback includes a vehicle facing portion. The vehicle facing portion includes a first bracket and a second bracket mounted to a frame and a module mounted to the first bracket and the second bracket. The module includes protrusions that are rotatably coupled to first apertures in the first bracket and a mounting apparatus for securing the module to the second bracket.

Embodiments of the first embodiment of the disclosure can include any one or a combination of the following features:
  the seatback is in a substantially vertical position, the first bracket comprises a lower bracket and the second bracket comprises an upper bracket;
  a cover member secured to the lower bracket and the upper bracket;
  the module is selectively detachable from and selectively attachable to the first bracket and the second bracket; and/or
  the protrusions comprise hooks and wherein the mounting apparatus comprises holes in an upper portion of the module and connectors that extend through the holes in the upper portion of the module and the apertures in the second bracket.

According to another embodiment of the present disclosure, a vehicle seating assembly includes a seat and a seatback. The seatback has a container including an enclosed storage space and an open storage space. The seatback is selectively and alternatively positionable in substantially vertical and substantially horizontal positions. The enclosed storage space is usable in the substantially vertical and substantially horizontal positions and the open storage space is usable in the substantially horizontal position.

Embodiments of the second embodiment of the disclosure can include any one or a combination of the following features:
  the enclosed storage space is partially defined by a seatback facing wall and a vehicle facing wall, wherein the seatback facing wall is opposed to the vehicle facing wall, and wherein the enclosed storage space is accessible through a door disposed in the vehicle facing wall;
  a hinge assembly connects the door to the container;
  the container is coupled to a frame assembly disposed in the seatback; and/or
  the frame assembly comprises a first bracket and a second bracket and wherein latches secure the container to the second bracket.

According to yet another embodiment of the present disclosure, a system of attachment points for a vehicle seatback includes a seatback including a frame assembly. A plurality of apertures are disposed in the frame assembly. The system of attachment points includes an attachment member. A projection extends from the attachment member. At least one aperture of the plurality of apertures is configured to receive the projection to releasably fasten the attachment member to the frame assembly.

Embodiments of the third embodiment of the disclosure can include any one or a combination of the following features:
  the attachment member comprises a module and wherein the module includes a plurality of projections;
  the module comprises a first portion and a second portion, wherein the frame assembly includes a first bracket and a second bracket, and wherein the first portion is secured to the first bracket and the second portion is secured to the second bracket;
  the module includes a panel, wherein the panel includes a tray, wherein a hinge couples the tray to the panel, wherein the tray is selectively rotatable about an axis defined by the hinge, wherein when the seatback is in a substantially horizontal position the tray is selectively positionable in a substantially horizontal position or an inclined position, and wherein when the seatback is in a substantially vertical position the tray is selectively positionable in a stored position or a table position;
  the tray includes a vehicle facing surface and a seatback facing surface and wherein the vehicle facing surface includes a holder for an entertainment device;
  the module comprises a load floor assembly;
  the module comprises a panel and strap assembly;
  the attachment member comprises an insert and wherein the insert includes one projection;
  the attachment member comprises an insert and wherein the insert includes a plurality of projections; and/or
  the attachment member comprises a first insert and a second insert, wherein the frame assembly comprises a first bracket and a second bracket, wherein the first insert is attached to the first bracket, and wherein the second insert is attached to the second bracket.

These and other embodiments, objects, and features of the present disclosure will be understood and appreciated by those skilled in the art upon studying the following specification, claims, and appended drawings.

BRIEF DESCRIPTION OF THE DRAWINGS

In the drawings:

FIG. 17 is a side perspective view of a seatback with a cover and an oval attachment and a decal positioned above the cover in a substantially horizontal position of another embodiment; and FIG. 18 is a side perspective view of a seatback with a cover and an oval attachment and a decal of FIG. 17 attached to the cover in a substantially horizontal position.

DETAILED DESCRIPTION

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
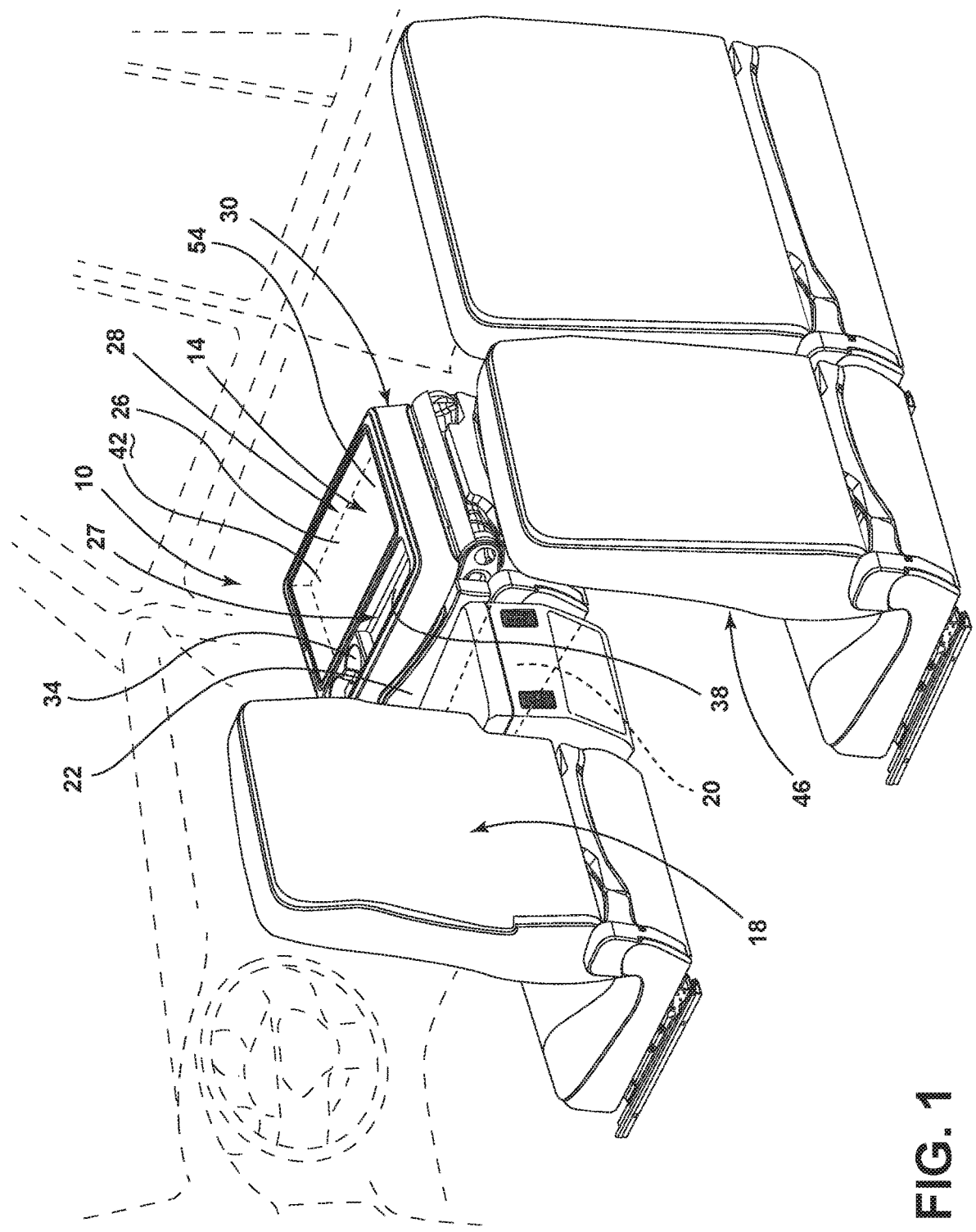
FIG. 1 is a side perspective view of a vehicle interior with a seatback including a container in a substantially horizontal position, according to one embodiment.

Referring to FIG. 1, a vehicle interior 10 is shown having a passenger side seating assembly 14 and a driver side seating assembly 18. The passenger side seating assembly 14 is equipped with a seat 20 and a seatback 22 with a container 26 for storing one or more passenger items. The seatback 22 of the passenger side seating assembly 14 and the container 26 are in a substantially horizontal position 30. The container 26 includes an open storage space 27 and an enclosed storage space 28. In the depicted embodiment, the open storage space 27 includes the cupholders 34 and the recessed tray 38. The container 26 is positioned near the driver side seating assembly 18 so that a driver may conveniently access the container 26 while seated in the driver side seating assembly 18. When the container 26 is in the substantially horizontal position 30, the driver may store passenger items such as beverage containers in the cupholders 34 and writing utensils and coins in the recessed tray 38.

The driver may support a laptop computer on the work surface 42, or the driver may use the work surface 42 as a writing surface. Passengers seated in rear seats 46 may access passenger items stored in the cupholders 34 and the recessed tray 38. Passengers seated in rear seats 46 may place a laptop computer or entertainment device on the work surface 42 to view the laptop computer or entertainment device while they are seated in the rear seats 46. The enclosed storage space 28 is accessible to passengers in the driver side seating assembly 18 and the rear seats 46. In the depicted embodiment, the enclosed storage space 28 may be accessed through door 54.

Figure 2:
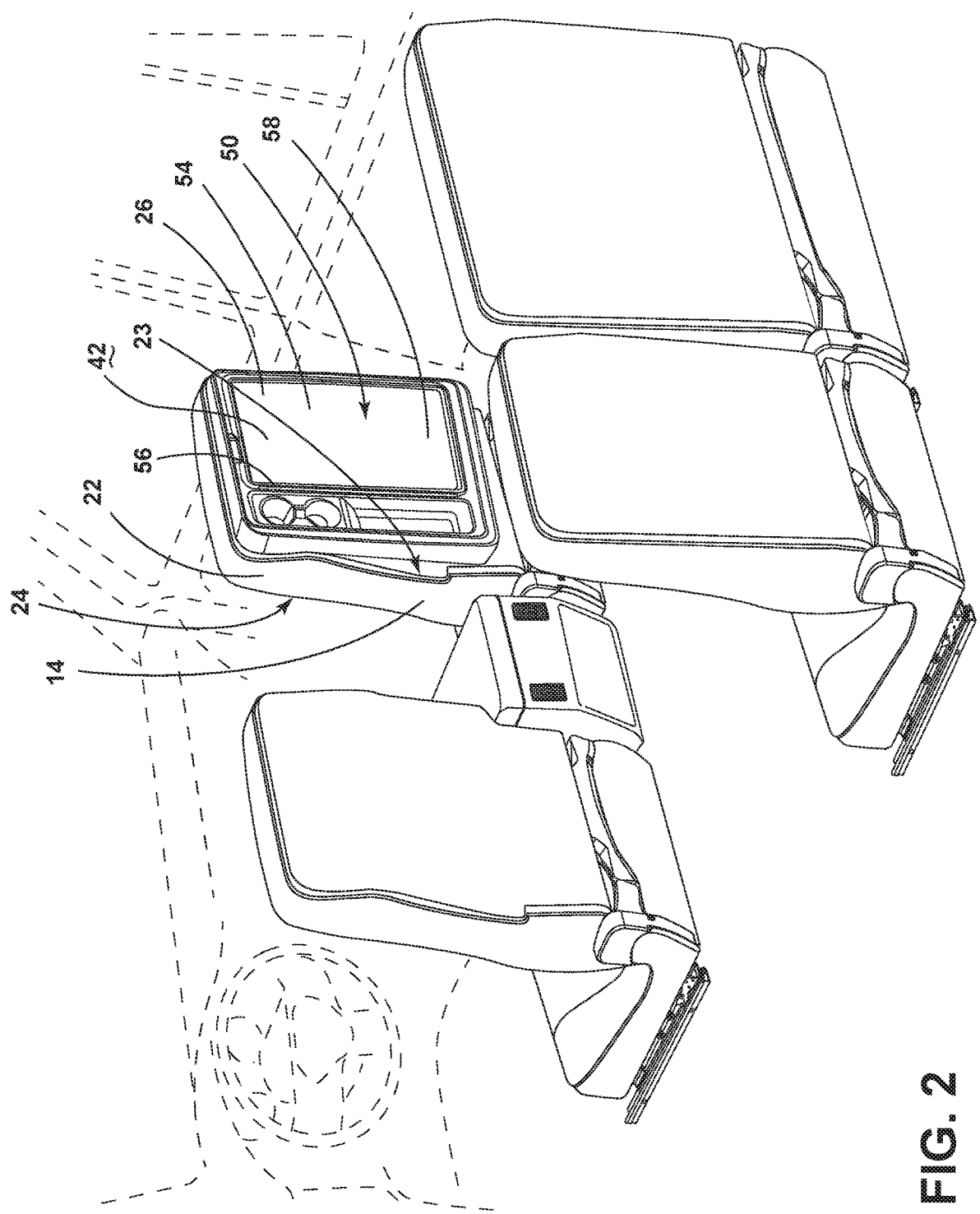
FIG. 2 is a side perspective view of the vehicle interior with the seatback including the container of FIG. 1 in a substantially vertical position.

Referring to FIG. 2, the seatback 22 of the passenger side seating assembly 14 and the container 26 are shown in a substantially vertical position 50. The seatback 22 includes a vehicle facing surface 23 and a an occupant facing surface 24. The container 26 is attached to the vehicle facing surface 23 of the seatback 22.

Figure 3:
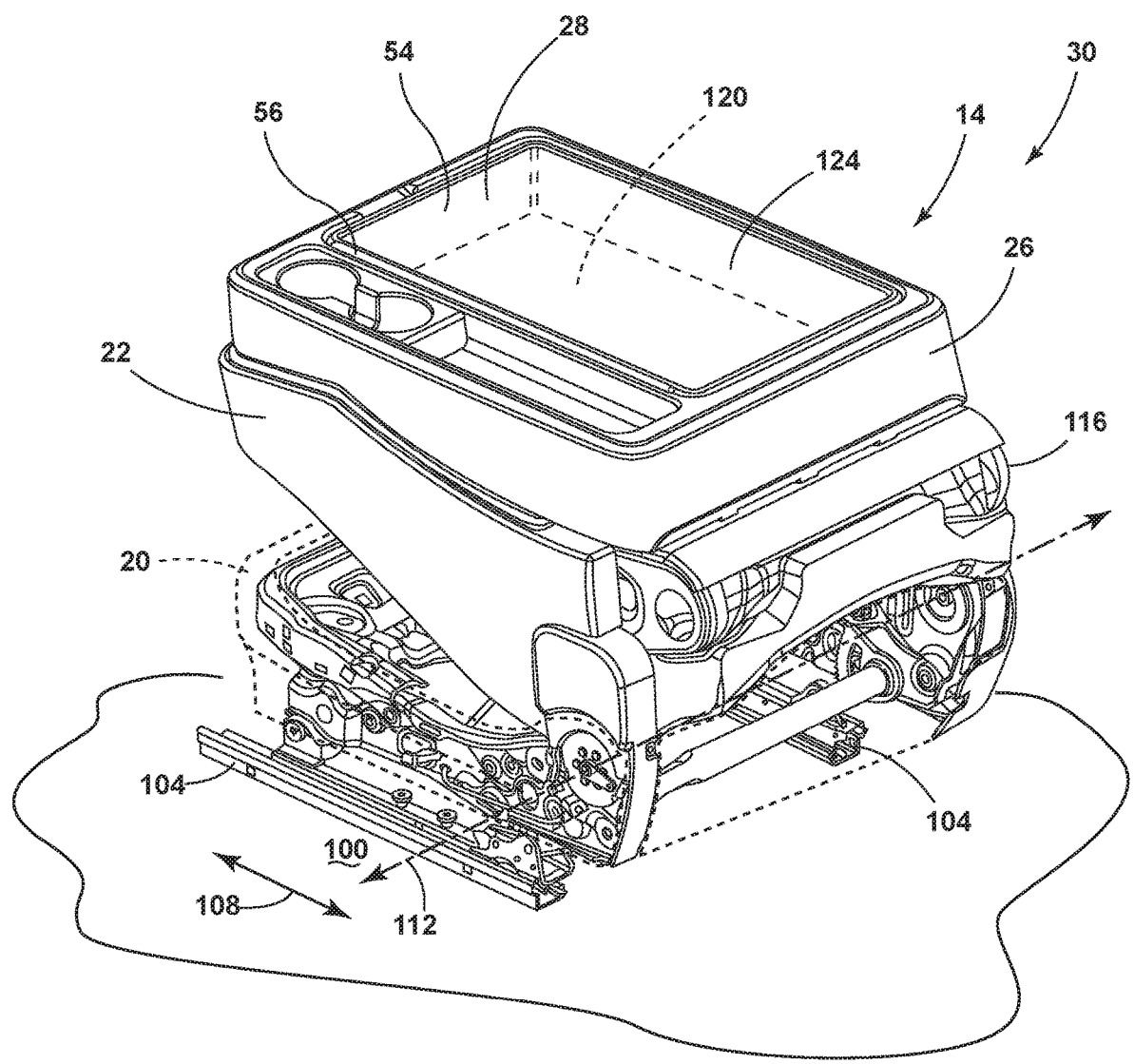
FIG. 3 is a side perspective view of the seatback including a container of FIG. 1 in a substantially horizontal position.
Figure 4:
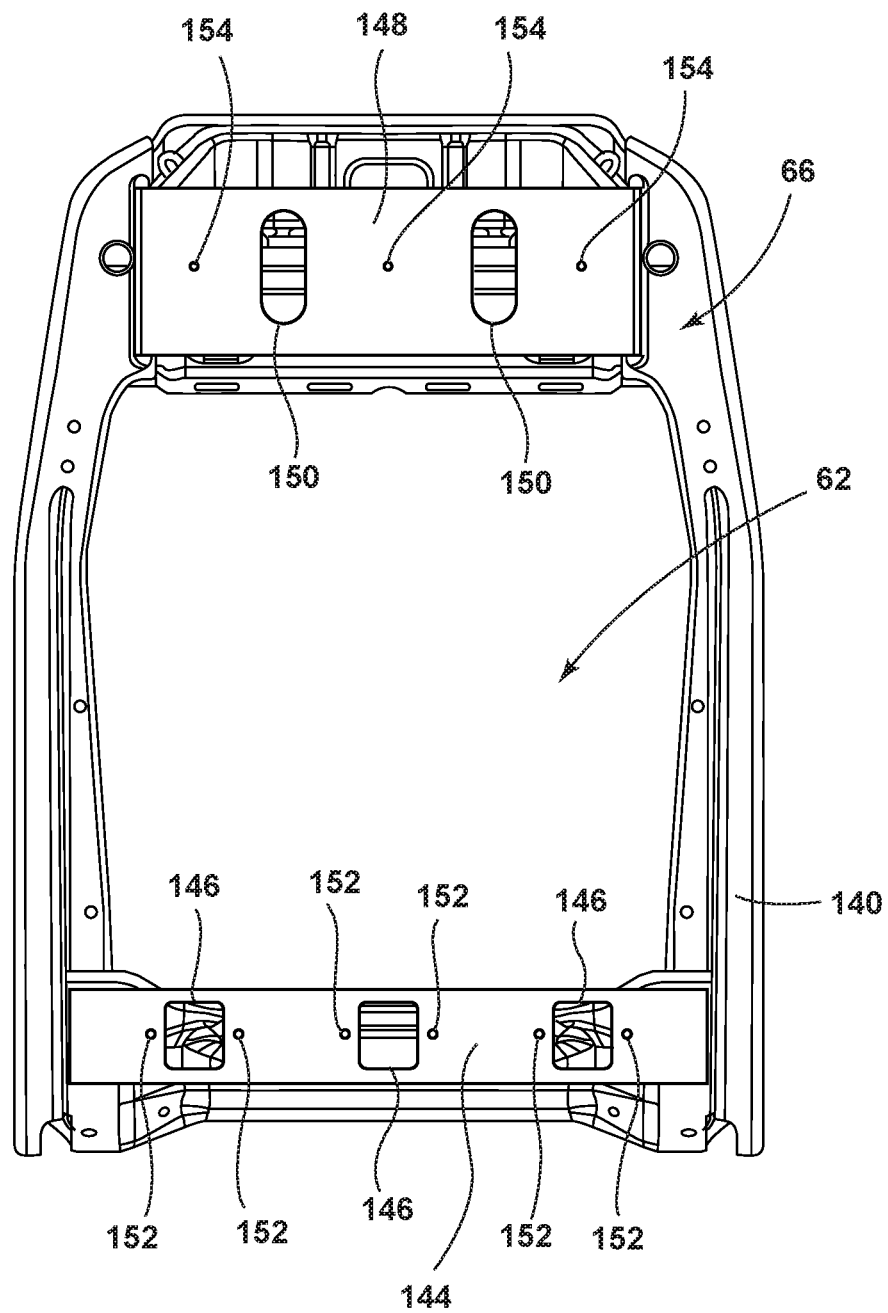
FIG. 4 is a back elevational view of a seatback frame assembly of an embodiment.
Figure 14:
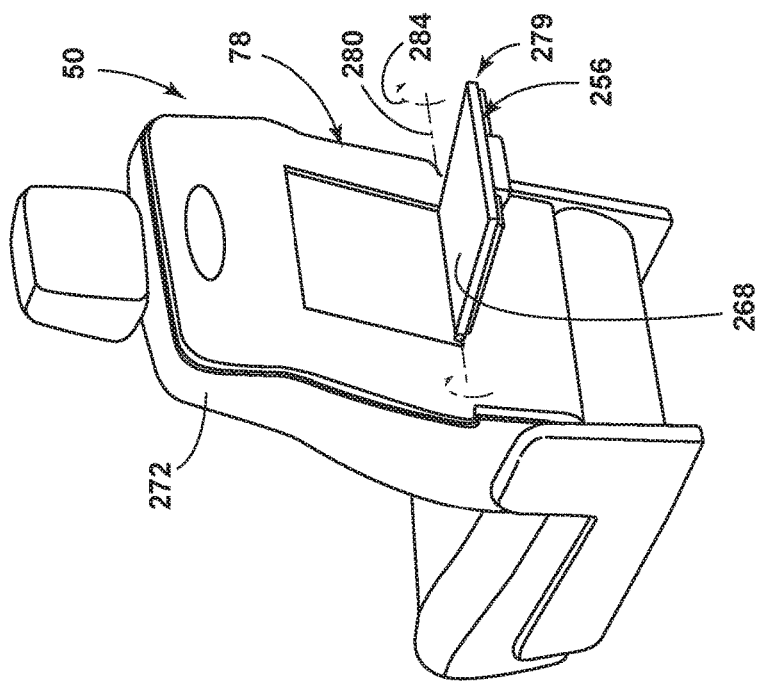
FIG. 14 is a side perspective view of the seatback with the panel and entertainment holder assembly of FIG. 13 in a substantially vertical position with the tray in a table position.

Referring to FIGS. 3-4, in various embodiments, the container 26 is one of a series of modules that may be secured to a universal system of attachment points 62 of the frame assembly 66 of the passenger seatback 22. The frame assembly 66 includes the frame 140, the first bracket 144, and the second bracket 148. In the depicted embodiment, the universal system of attachment points 62 includes first apertures 146 on the first bracket 144 and second apertures 150 on the second bracket 148. The universal system of attachment points 62 on the seat frame assembly 66 in the passenger seatback 22 allows attachment members to be added to the seat frame assembly 66. The attachment members include modules and inserts. A module is typically fastened to the first bracket 144 and the second bracket 148. An insert is typically fastened to the first bracket 144 or the second bracket 148. Interchangeable modules with unique features may be selectively added to and removed from the seat frame assembly 66. The modules may be purchased at the time of an initial vehicle purchase or as after-market items. With reference to FIGS. 1-14, the modules include the container 26 (FIGS. 1-3, 6-10), a load floor assembly 70 (FIG. 11), a panel and strap assembly 74 (FIG. 12), and a panel and entertainment holder assembly 78 (FIGS. 13-14). Referring to FIGS. 15-18, the inserts include hooks 292 (FIGS. 15-16), a rectangular attachment 296 (FIGS. 15-16), an oval attachment 312 (FIGS. 17-18), and a decal 308 (FIGS. 17-18).

Referring to FIG. 3, the passenger side seating assembly 14 is coupled to a floor 100 with rails 104. The passenger side seating assembly 14 is movable along the rails 104 in a longitudinal direction shown by arrow 108. The seatback 22 is pivotably coupled to the seat 20 and rotates around an axis 112 between at least the substantially horizontal position 30 and the substantially vertical position 50 (FIG. 2). A seatback facing wall 120 and a vehicle facing wall 124 of the container 26 partially define an enclosed storage space 28 in the container 26. The vehicle facing wall 124 includes the door 54 and the hinge assembly 56 that couples the door 54 to the vehicle facing wall 124.

Figure 5:
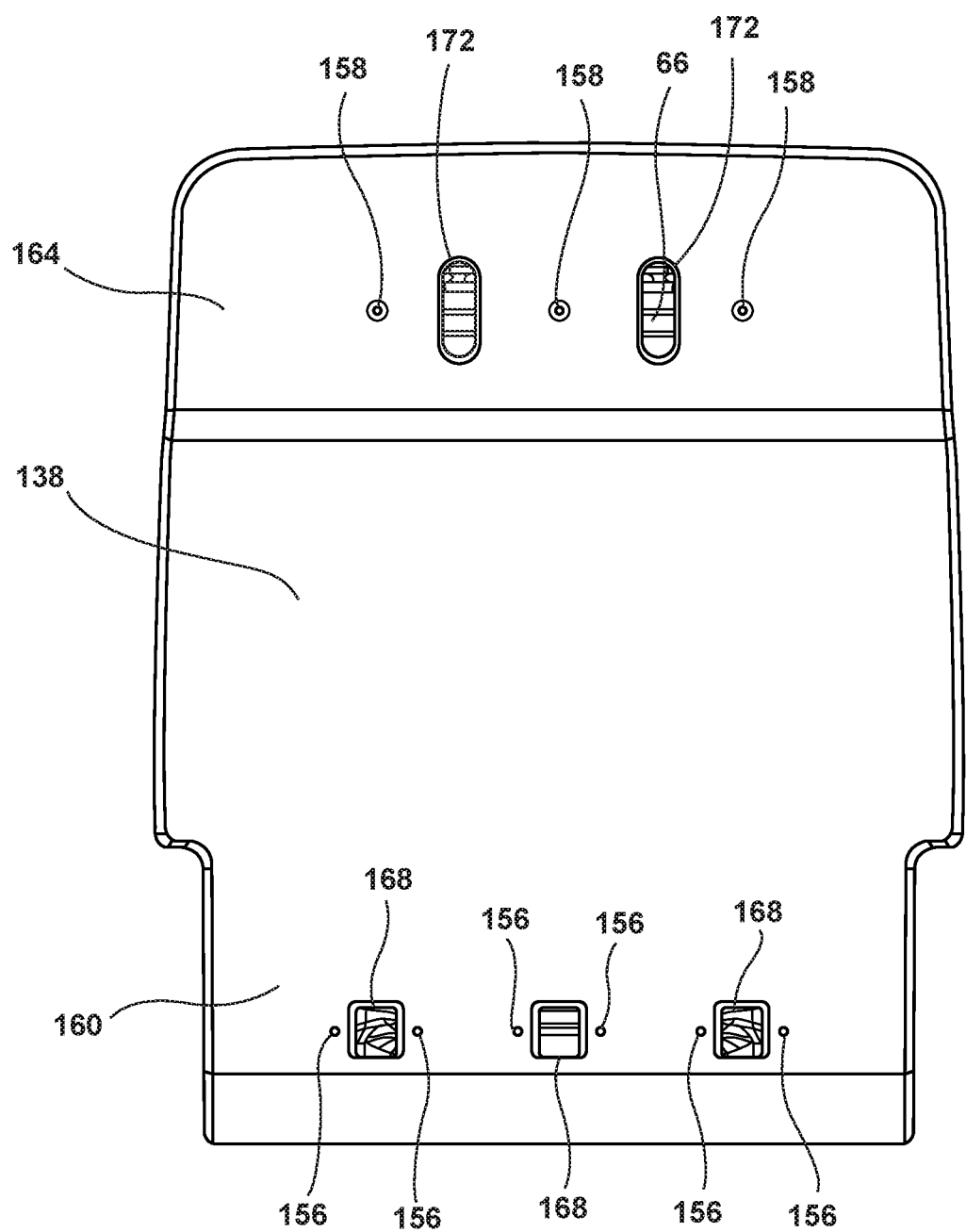
FIG. 5 is a back elevational view of a cover attached to a seatback frame assembly of an embodiment.

Referring to FIGS. 4-5, the frame assembly 66 (FIG. 4) and the frame assembly 66 with a cover member or cover 138 (FIG. 5) are shown. The first bracket 144 and the second bracket 148 are mounted to the frame 140. The first bracket 144 and the second bracket 148 are configured to receive interchangeable modules that are selectively mounted to the first bracket 144 and the second bracket 148. The first bracket 144 and the second bracket 148 are configured to receive interchangeable inserts that are selectively mounted to the first bracket 144 or the second bracket 148.

The first bracket 144 includes first holes 152 for receiving first fasteners 156 for mounting the cover 138 to the first bracket 144. The second bracket 148 includes second holes 154 for receiving second fasteners 158 for mounting the cover 138 to the second bracket 148.

Referring to FIGS. 4-5, the cover 138 is typically secured to the frame assembly 66. The cover 138 includes a first portion 160 and a second portion 164. The first portion 160 includes first openings 168. The second portion 164 includes second openings 172. A module attaches to the first openings 168 of the cover 138 and the first apertures 146 of the first bracket 144 and the second openings 172 of the cover 138 and the second apertures 150 of the second bracket 148. An insert attaches to the first openings 168 of the cover 138 and the first apertures 146 of the first bracket 144 or the second openings 172 of the cover 138 and the second apertures 150 of the second bracket 148. The cover 138 is typically shaped to fit over the contours of the frame assembly 66. In various embodiments, the cover 138 may be a polypropylene plastic.

Figure 6:
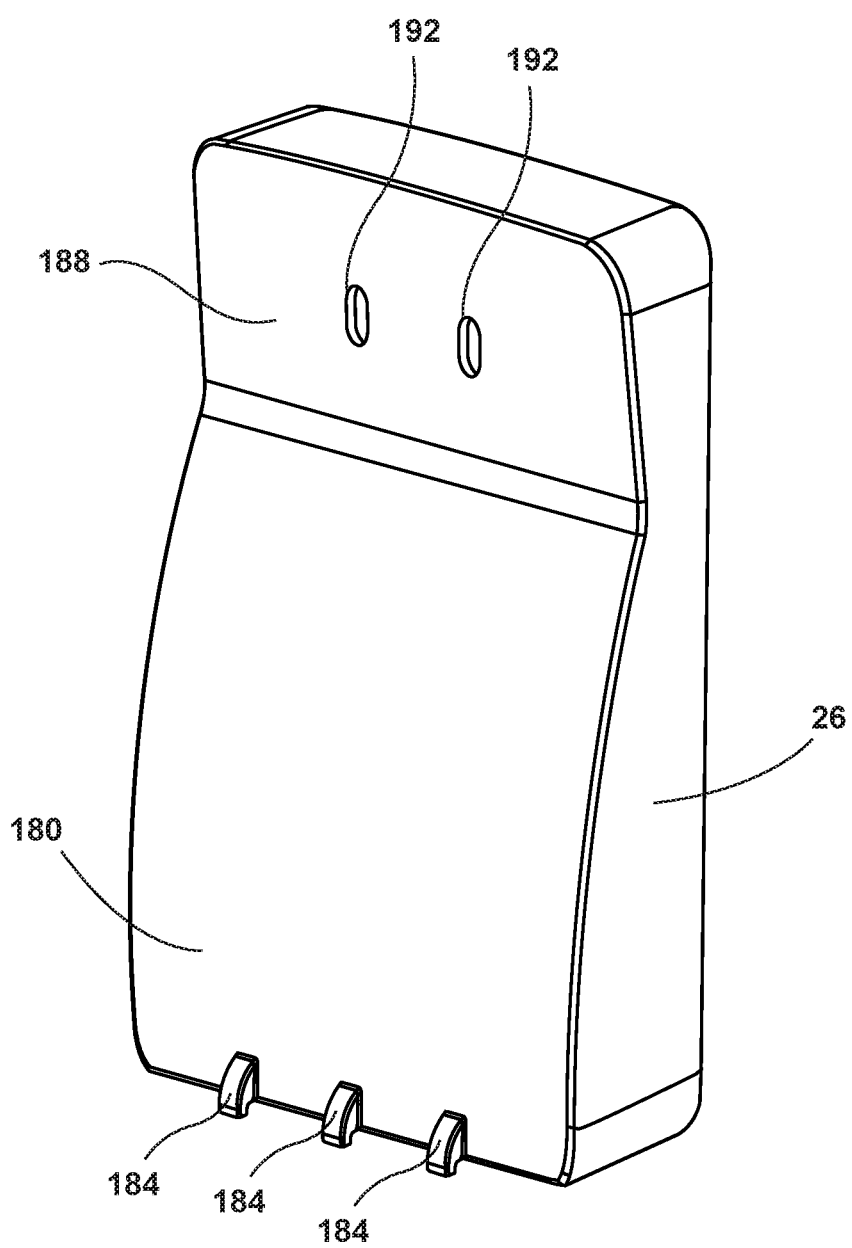
FIG. 6 is a perspective view of the container of FIG. 1.

Referring to FIG. 6, the container 26 is shown. The container 26 includes a first portion 180 with protrusions 184. The protrusions 184 are hook-shaped. The container 26 includes a second portion 188 with holes 192 for receiving connectors for mounting the second portion 188 to the second bracket 148.

Figure 7:
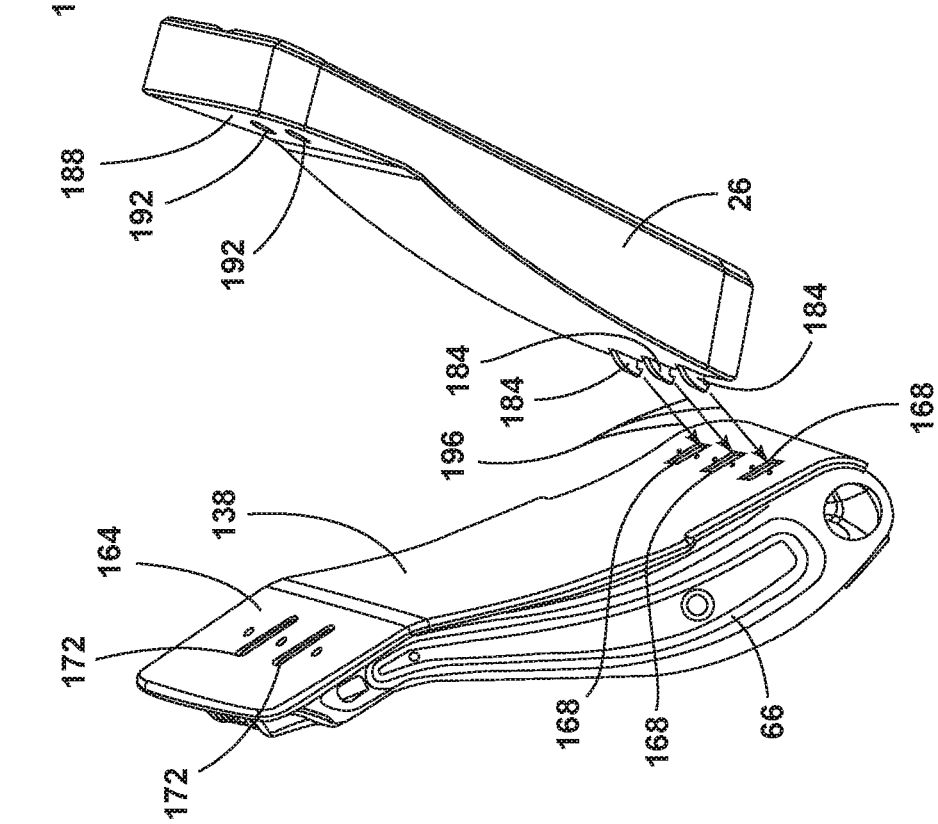
FIG. 7 is a side perspective view of a first step of attaching the container of FIG. 1 to a frame assembly.

Referring to FIGS. 7-10, four exemplary steps for attaching the container 26 to the frame assembly 66 are shown. FIG. 7 shows the first exemplary step for attaching the container 26 to the frame assembly 66. Referring to FIGS. 4-7, the protrusions 184 of the container 26 are inserted through the first openings 168 in the cover 138 and the first apertures 146 of the first bracket 144. Arrows 196 show the direction of insertion of the protrusions 184 into the first openings 168 in the cover 138 and the first apertures 146 of the first bracket 144.

Figure 8:
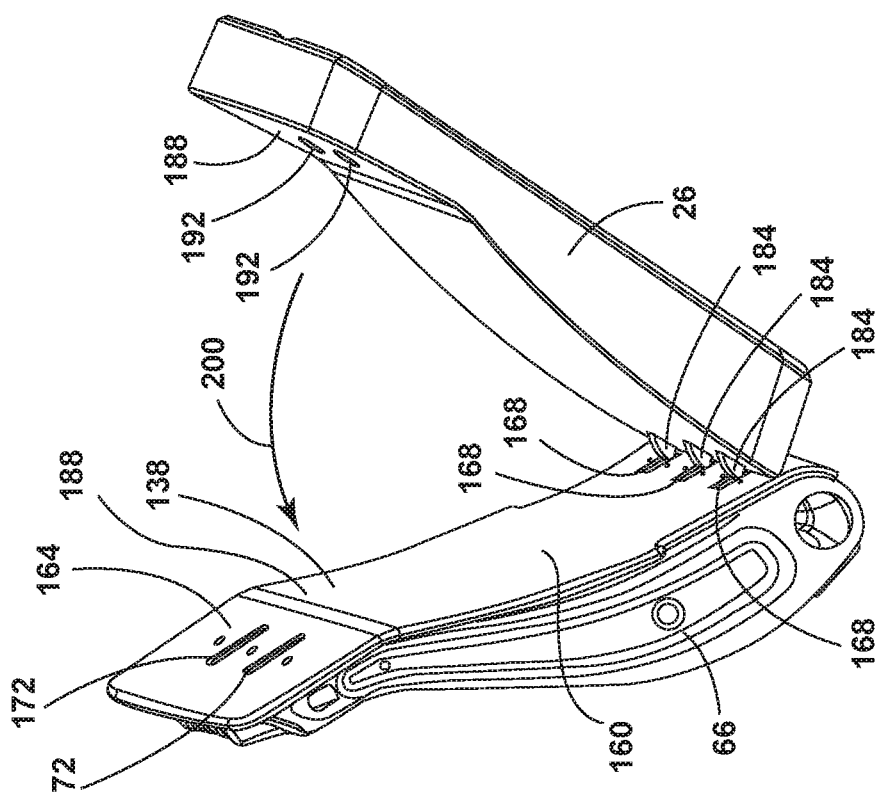
FIG. 8 is a side perspective view of a second step of attaching the container of FIG. 1 to a frame assembly.

FIG. 8 shows the second exemplary step for attaching the container 26 to the frame assembly 66. Referring to FIGS. 4-8, the container 26 is rotated toward the frame assembly 66 in the direction depicted by arrow 200. The second portion 188 of the container 26 is rotated until it is in contact with the second portion 164 of the cover 138.

Figure 9:
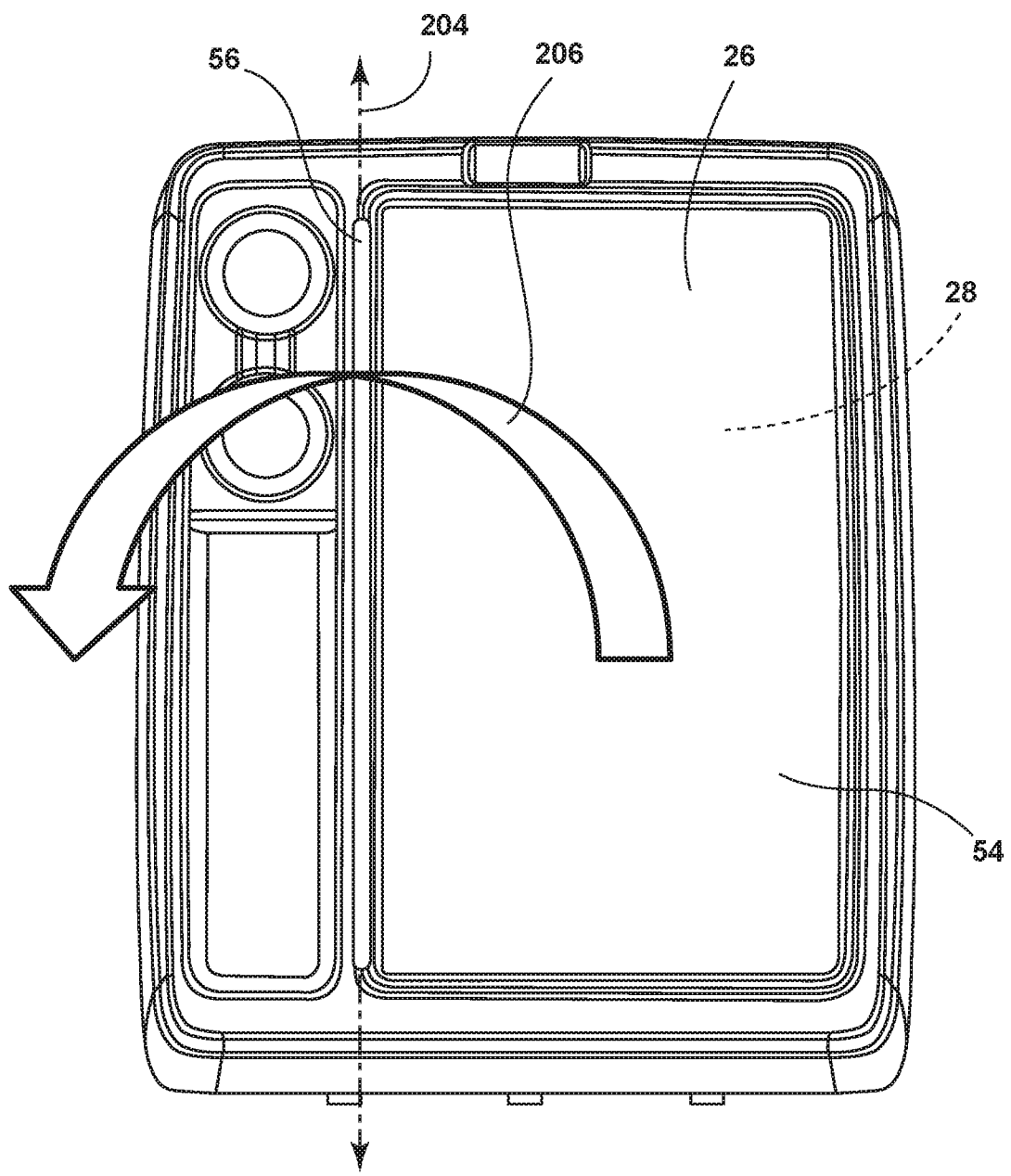
FIG. 9 is a back elevational view of a third step of attaching the container of FIG. 1 to the frame assembly.

Referring to FIG. 9, the third exemplary step for attaching the container 26 to the frame assembly 66 is shown. The door 54 of the container 26 swings open around an axis 204 defined by the hinge assembly 56 in the direction depicted by arrow 206 to provide access to the enclosed storage space 28. In various embodiments, the hinge assembly 56 may be a piano hinge.

Figure 10:
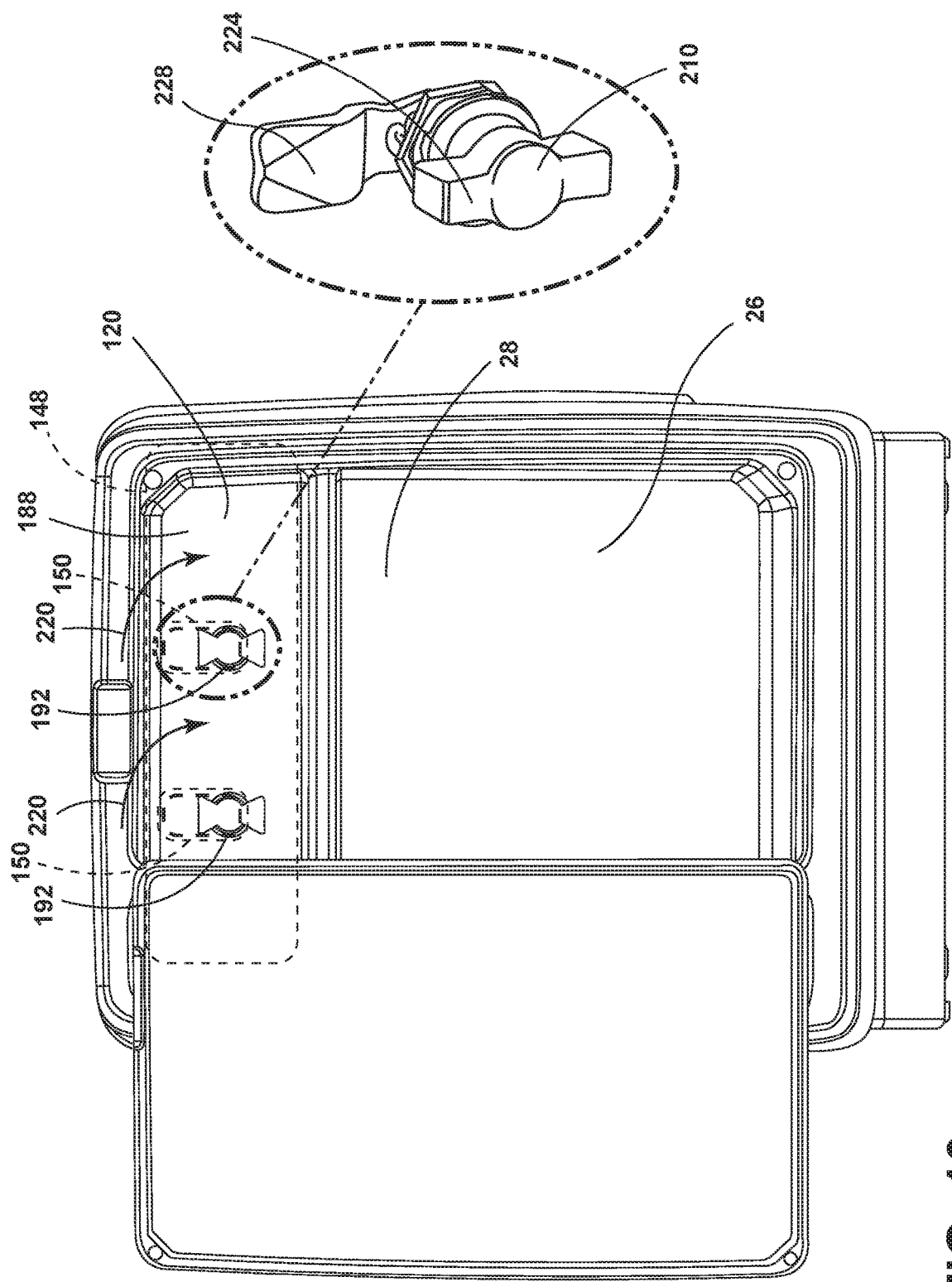
FIG. 10 is a back elevational view of a fourth step of attaching the container of FIG. 1 to the frame assembly.

Referring to FIG. 10, the fourth exemplary step for mounting the container 26 to the frame assembly 66 is shown. The holes 192 for mounting the container 26 to the second bracket 148 are disposed in the enclosed storage space 28. In various embodiments of the disclosure, a variety of connectors, such as cam latches 210, may be inserted into the holes 192 in the enclosed storage space 28 to mount the container 26 to the second bracket 148. The fourth step for attaching the container 26 to the frame assembly 66 includes positioning two quarter turn cam latches 210 in the apertures 150 of the second bracket 148 and arranging an actuator portion (handle 224) of the quarter turn cam latches 210 on the seatback facing wall 120 of the enclosed storage space 28. The cam 228 of each quarter turn cam latch 210 is rotated from a substantially vertical position to a substantially horizontal position in the direction depicted by arrows 220 to secure the second portion 188 of the container 26 to the second bracket 148. During the assembly process of the fourth exemplary step, the container 26 is pressed against the second bracket 148 while the cam 228 of the quarter turn cam latch 210 is behind the second bracket 148. The handle 224 is turned to lock the cam 228 behind the second bracket 148. Thus, the four exemplary steps depicted in FIGS. 7-10 allow a vehicle user to attach the container 26 to the frame assembly 66. The user may follow the four exemplary steps in reverse chronological order to detach the container 16 from the frame assembly 66.

Figure 11:
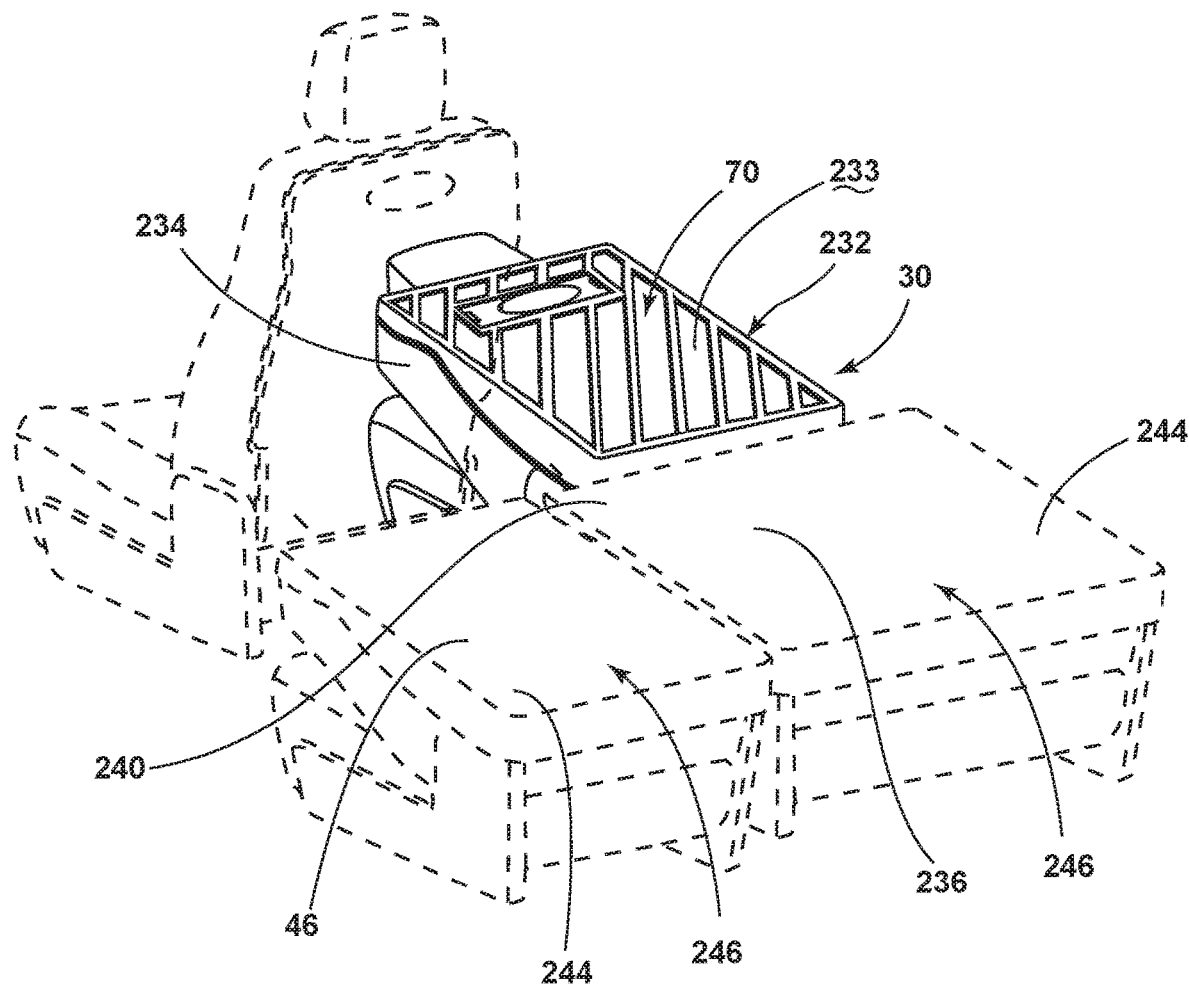
FIG. 11 is a side perspective view of a seatback with a load floor assembly in a substantially horizontal position of another embodiment.

FIGS. 11-15 show additional modules that may be attached to the universal system of attachment points 62 of the frame assembly 66. Referring to FIG. 11, a load floor assembly 232 may be attached to the frame assembly 66 of seatback 234. The load floor assembly 232 includes a protective surface 233 for supporting cargo. In various embodiments, the protective surface 233 may be made of a rubber material. When the load floor assembly 232 is in the substantially horizontal position 30, the load floor assembly 232 and the seatbacks 244 of the rear seats 46 in a substantially horizontal position 246 may create a substantially flat load floor 240. With reference to FIGS. 4-11, the load floor assembly 232 may be attached to and detached from the frame assembly 66 in the same manner that the container 26 is attached to and detached from the frame assembly 66. With reference to FIGS. 4-11, a cover 138 may be secured to the frame assembly 66 that receives the load floor assembly 232.

Figure 12:
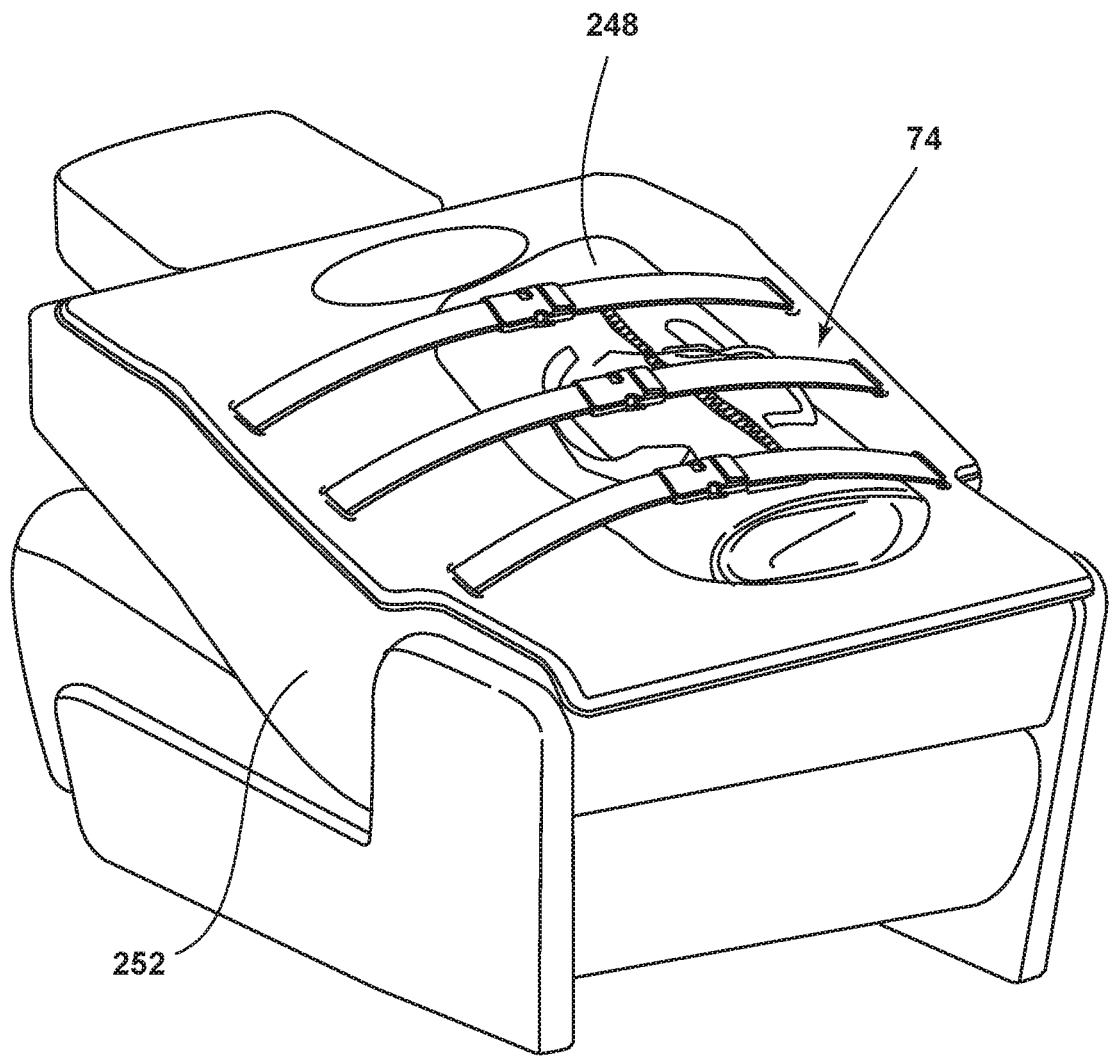
FIG. 12 is a side perspective view of a seatback with a panel and strap assembly in a substantially horizontal position of another embodiment.
Figure 12A:
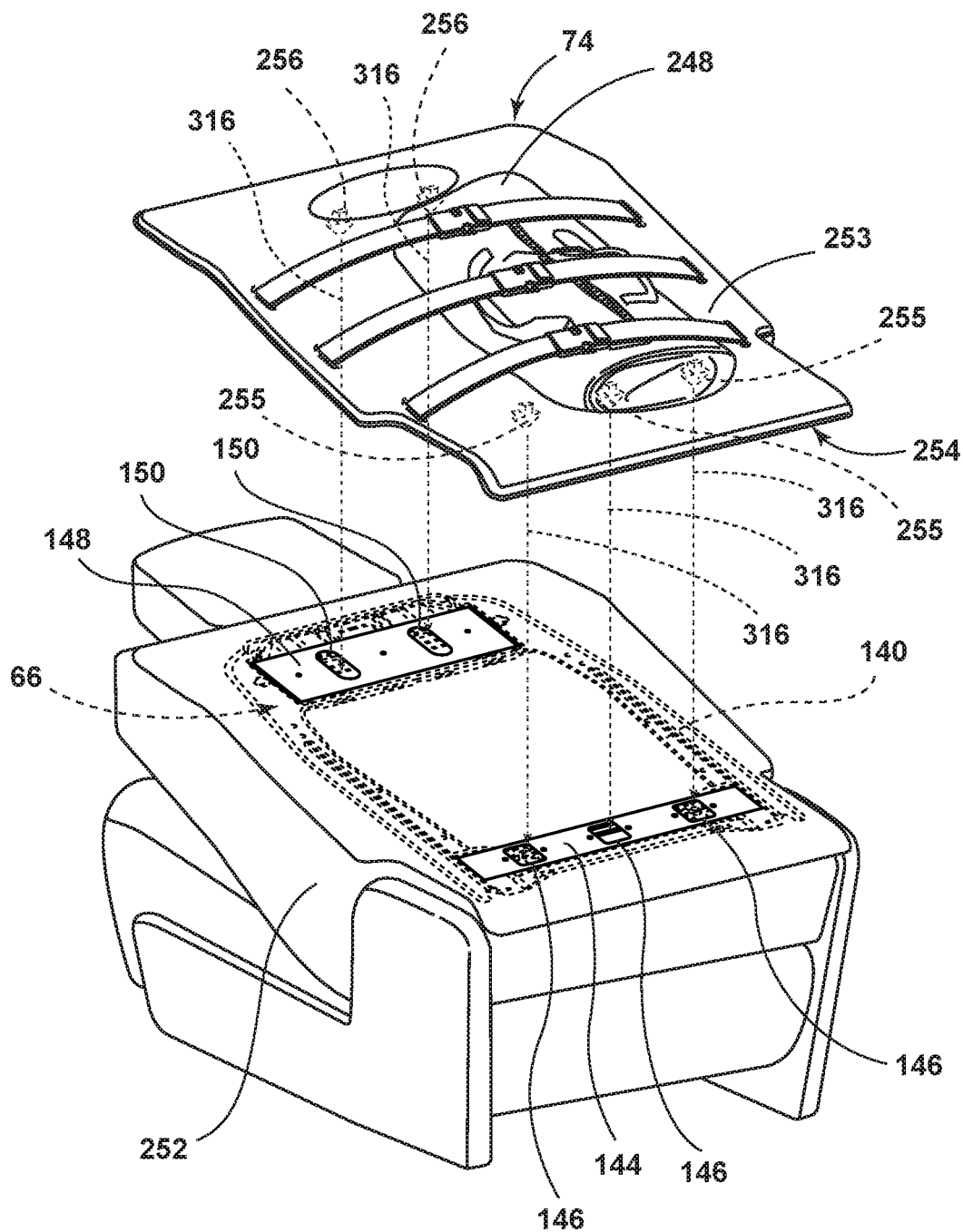
FIG. 12A is an exploded view of the seatback with a panel and strap assembly in a substantially horizontal position of FIG. 12.
Figure 13:
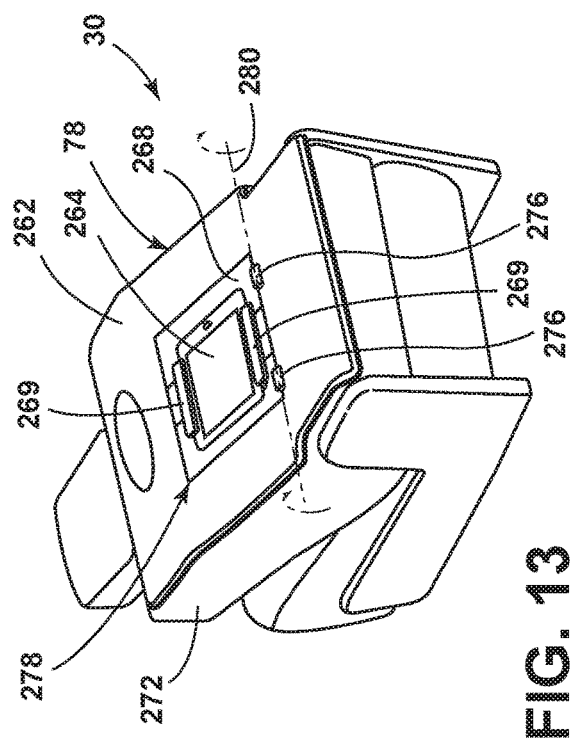
FIG. 13 is a side perspective view of a seatback with a panel and entertainment holder assembly in a substantially horizontal position with the tray in the stored position of another embodiment.

Referring to FIGS. 12-12A, in the depicted embodiment, a module comprises a panel and strap assembly 74 for securing a bag 248 or other object to a seatback 252. The seatback 252 includes a frame assembly 66 including a first bracket 144 and a second bracket 148. The panel 253 includes a seatback facing surface 254. First projections 255 extending from seatback facing surface 254 are inserted into first apertures 146 on the first bracket 144 to secure the panel and strap assembly 74 to the frame assembly 66. Second projections 256 extending from the seatback facing surface 254 of the panel 253 are inserted into second apertures 150 of the second bracket 148 to secure the panel and strap assembly 74 to the frame assembly 66. Referring again to FIGS. 12-12A, in various embodiments and as shown in FIGS. 4 and 5, a cover 138 may be secured to the frame assembly 66 that receives the panel and strap assembly 74. In various embodiments, the panel and strap assembly 74 is releasably secured to the frame assembly 66 through a friction fit or interference fit between the first projections 255 and the first apertures 146 and a friction fit or interference fit between the second projections 256 and the second apertures 150. In various embodiments, the first projections 255 and the second projections 256 may be made of a hard rubber material. Additionally, with reference to FIGS. 4-10 and 12-12A, in an alternate embodiment of the panel and strap assembly 74, the panel and strap assembly 74 may be attached to and detached from the frame assembly 66 in the same manner that the container 26 is attached to and detached from the frame assembly 66.

Figure 13A:
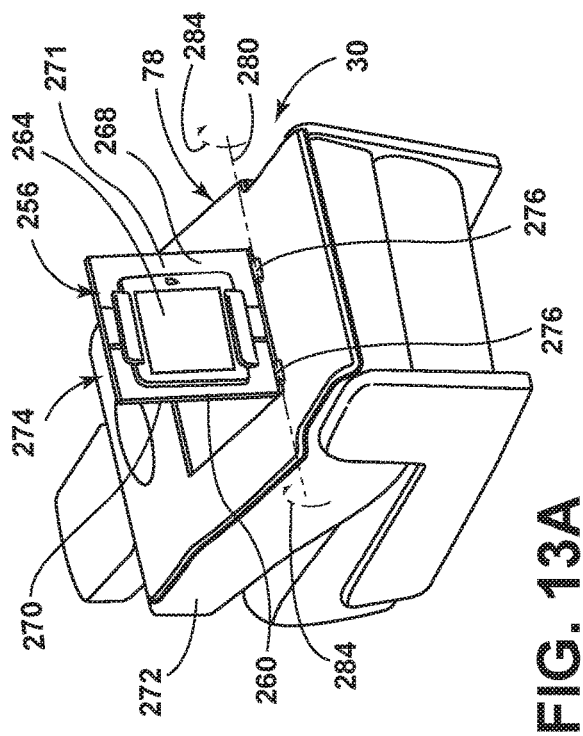
FIG. 13A is a side perspective view of the seatback with the panel and entertainment holder assembly of FIG. 13 with the tray in an inclined position.

Referring to FIGS. 13, 13A, and 14, another module is a panel and entertainment holder assembly 78. With reference to FIG. 13, the seatback 272 and the panel and entertainment holder assembly 78 are in a substantially horizontal position 30. The panel and entertainment holder assembly 78 is coupled to a seatback 272. The panel and entertainment holder assembly 78 includes a panel 262, a tray 268 with two opposed tabs 269 for retaining a tablet 264 or other entertainment device, and hinges 276 for attaching the tray 268 to the panel 262. The tray 268 is rotatably coupled to a panel 262. With reference to FIGS. 13 and 13A, when the seatback 272 and the panel and entertainment holder assembly 78 are in the substantially horizontal position 30, the tray 268 may be rotated about an axis 280 defined by hinges 276 to an inclined position 274 to be visible to a passenger seated behind the panel and entertainment holder assembly 78. Arrows 284 show the direction of rotation of the tray 268 around the axis 280. The tray 268 includes a seatback facing portion 270 and a vehicle facing portion 271. With reference to FIG. 14, the seatback 272 and the panel and entertainment holder assembly 78 are in a substantially vertical position 50. The tray 268 is in a table position 279. When the seatback 272 is in the substantially vertical position 50, the tray 268 may be rotated about the axis 280 in the direction depicted by arrow 284 from a stored position 278 (FIG. 13) to a table position 279 (FIG. 14). With reference to FIGS. 12A and 13, in various embodiments, the panel and entertainment holder assembly 78 may be secured to and released from the frame assembly 66 in the same manner that the panel and strap assembly 74 may be secured to and released from the frame assembly 66. Referring to FIGS. 4-5, 12A, and 13, in various embodiments, a cover 138 may be attached to the frame assembly 66 that receives the panel and entertainment holder assembly 78.

Figure 16:
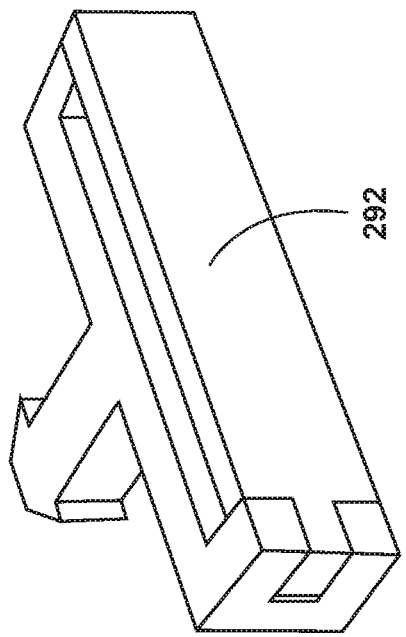
FIG. 16 is a side perspective view of a hook of FIG. 15.
Figure 15:
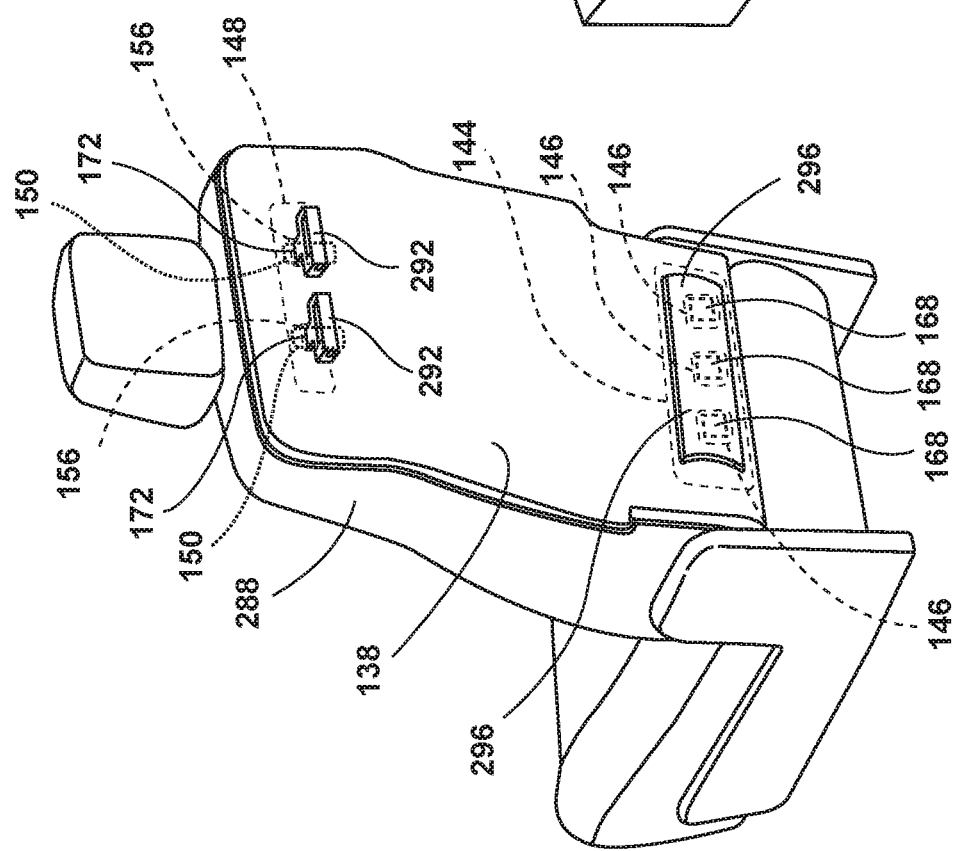
FIG. 15 is a side perspective view of a seatback with a cover, two hooks, and a rectangular attachment in a substantially vertical position of another embodiment.

Referring to FIGS. 15-18, in various embodiments, inserts may be put into the first apertures 146 and the second apertures 150 of the first bracket 144 and the second bracket 148, respectively. In various aspects, the inserts are releasable from the first apertures 146 and the second apertures 150 of the first bracket 144 and the second bracket 148. In various aspects, the inserts 146 may be made of a hard rubber material that forms a friction fit or an interference fit between the first apertures 146 and the second apertures 150 of the first bracket 144 and the second bracket 148. Referring to FIGS. 15 and 16, a seatback 288 includes the cover 138. A rectangular attachment 296 is inserted in first openings 168 in the cover 138 and first apertures 146 in the first bracket 144. Hooks 292 are inserted in second openings 172 in the cover 138 and second apertures 150 in the second bracket 148. In various embodiments, the inserts (rectangular attachment 296 and hooks 292 in FIGS. 15-16) may be removed from the cover 138 and replaced with a module or one or more inserts.

Referring now to FIG. 17, a seating assembly 300 is shown with a seatback 304 in the substantially horizontal position 30. A decal 308 and an oval 312 are positioned to be inserted into the first openings 168 and the second openings 172, respectively, of the cover 138. The decal 308 and the oval 312 will fasten to the first apertures 146 of the first bracket 144 and the second apertures 150 of the second bracket 148, respectively, of the frame assembly 66. Arrows 316 depict the directions of insertion of the decal 308 and the oval 312 in the first openings 168 and the second openings 172 of the cover 138, respectively.

Referring to FIG. 18, the seating assembly 300 is shown with the seatback 304 in the substantially horizontal position 30 and the inserts (decal 308 and oval 312) inserted into the cover 138. In various embodiments, the inserts (decal 308 and oval 312) may be removed from the cover 138 and replaced with a module or one or more inserts.

In various embodiments, the modules may be box-like (container 26 and load floor assembly 232). In various embodiments, the modules may be substantially flat (panel and strap assembly 74, panel and entertainment holder assembly 78).

Referring to FIGS. 1-18, in various embodiments and with reference to the seatback 22, 234, 252, 272, 288, or 304 in a substantially vertical position 50, the first bracket 144 may be referred to as a lower bracket and the second bracket 148 may be referred to as an upper bracket. Referring to FIGS. 1-14, in various embodiments and with reference to the seatback 22, 234, 252, or 272 in a substantially vertical position 50, the first portion of a module (e.g., first portion 180 of container 26) may be a lower portion of the module, and the second portion of the module (e.g., second portion 188 of container 26) may be an upper portion of the module.

In various embodiments of the disclosure, when no feature modules or inserts are desired for attachment to the seatback, a set of rubber plugs may be used to cover the first openings 168 and the second openings 172 in the cover 138 to prevent dirt, trash, or the fingers of a person from getting inside the first openings 168 and the second openings 172. In various other embodiments of the disclosure, first apertures 146 in the first bracket 144 and second apertures 150 in the second bracket 148 may be covered by a set of plugs to prevent dirt, trash, or fingers from getting inside the first apertures 146 and the second apertures 150.

In various embodiments, the first bracket 144 may include two apertures 146, and the first portion 160 of the cover 138 may include two first openings 168.

In various embodiments, the seating assembly may be used in locations other than or in addition to the front passenger seat.

In various embodiments, the modules may be used with seats that are typically in the substantially vertical position.

A variety of advantages may be derived from use of the present disclosure. A universal system of attachment points on the passenger seatback allows for a variety of useful features to be added and secured to the seat frame. The disclosure allows for customization of interior features. Vehicle interior space is limited, and the disclosure makes use of a previously unused surface (i.e., the vehicle facing seatback surface) to add more functionality to the vehicle interior while maintaining the functionality of a standard passenger seat and preserving passenger leg room and seating space. A module or insert may be attached to a vehicle facing seatback surface when the passenger would like to use the features of the module or the insert. A module or insert may be removed and stored when it is not needed and when additional passenger space is desired.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:
1. A vehicle seating assembly comprising:
a seat; and
a seatback comprising a vehicle facing portion having:
first and second brackets mounted to a frame;
a module mounted to the first and second brackets; and
a cover extending over the first and second brackets and having:
a first portion extending over the first bracket; and
a second portion extending over the second bracket, wherein the cover is disposed between the first and second brackets and the module, wherein the module includes protrusions that are rotatably coupled to apertures in the first bracket, and wherein the module includes a mounting apparatus for securing the module to the second bracket.

2. The vehicle seating assembly of claim 1, wherein when the seatback is in a substantially vertical position, the first bracket comprises a lower bracket and the second bracket comprises an upper bracket.

3. The vehicle seating assembly of claim 2, wherein the cover is secured to the lower bracket and the upper bracket.

4. The vehicle seating assembly of claim 3, wherein the module is selectively detachable from and selectively attachable to the lower bracket and the upper bracket.

5. The vehicle seating assembly of claim 2, wherein the protrusions comprise hooks and wherein the mounting apparatus comprises holes in an upper portion of the module and connectors that extend through the holes in the upper portion of the module and apertures in the upper bracket.

6. The vehicle seating assembly of claim 1, wherein the module includes a first portion and a second portion.

7. The vehicle seating assembly of claim 6, wherein the first portion of the cover includes a curved portion and wherein the second portion of the cover includes a planar portion.

8. The vehicle seating assembly of claim 7, wherein the first portion of the module includes a curved portion and wherein the second portion of the module includes a planar portion.

9. The vehicle seating assembly of claim 8, wherein the module and the cover are in a conforming relationship when the module is mounted to the cover.

10. The vehicle seating assembly of claim 9, wherein the cover includes polypropylene plastic.

11. A vehicle seating assembly comprising:
a seat; and
a seatback having:
a frame assembly including first and second brackets;
a detachable container disposed on a vehicle facing surface of the seatback and including:
an enclosed storage space; and
an open storage space; and
a hook-shaped protrusion extending from the detachable container and rotatably engaged with an aperture in the first bracket; and
a cover disposed between the first and second brackets and the detachable container, wherein the detachable container is rotatable toward the second bracket until the detachable container is mountable to the second bracket with a connector, wherein the seatback is selectively and alternatively positionable in substantially vertical and substantially horizontal positions, and wherein the enclosed storage space is usable in the substantially vertical and substantially horizontal positions and the open storage space is usable in the substantially horizontal position.

12. The vehicle seating assembly of claim 11, wherein the enclosed storage space is partially defined by a seatback facing wall and a vehicle facing wall, wherein the seatback facing wall is opposed to the vehicle facing wall, and wherein the enclosed storage space is accessible through a door disposed in the vehicle facing wall.

13. The vehicle seating assembly of claim 12, wherein a hinge assembly connects the door to the detachable container.

14. The vehicle seating assembly of claim 13, wherein the first bracket includes a lower bracket and wherein the second bracket includes an upper bracket.

15. The vehicle seating assembly of claim 14, wherein the cover extends over the frame assembly.

16. The vehicle seating assembly of claim 15, wherein the detachable container extends over the cover.

17. A system of attachment points for a vehicle facing surface of a vehicle seatback, comprising:
a seatback comprising a frame assembly;
a plurality of first apertures disposed in the frame assembly and a second aperture disposed in the frame assembly;
a detachable module including:
a first seatback facing portion;
a second seatback facing portion; and
a plurality of projections extending from the first seatback facing portion and couplable to the plurality of first apertures disposed in the frame assembly; and
a cover extending over the frame assembly and disposed between the frame assembly and the detachable module; and
a connectors for securing the second seatback facing portion of the detachable module to the second aperture disposed in the frame assembly.

18. The system of attachment points for a vehicle facing surface of a vehicle seatback of claim 17, wherein when the seatback is in a substantially vertical position the first seatback facing portion of the detachable module includes a lower portion of the detachable module and the second seatback facing portion of the detachable module includes an upper portion of the detachable module.

19. The system of attachment points for a vehicle facing surface of a vehicle seatback of claim 18, wherein the first apertures disposed in the frame assembly are disposed in a lower bracket of the frame assembly.

20. The system of attachment points for a vehicle seatback of claim 19, wherein the module includes a panel, wherein the panel includes a tray, wherein a hinge couples the tray to the panel, wherein the tray is selectively rotatable about an axis defined by the hinge, wherein when the seatback is in a substantially horizontal position the tray is selectively positionable in a substantially horizontal position or an inclined position, and wherein when the seatback is in a substantially vertical position the tray is selectively positionable in a stored position or a table position.

21. The system of attachment points for a vehicle seatback of claim 20, wherein the tray includes a vehicle facing surface and a seatback facing surface and wherein the vehicle facing surface includes a holder for an entertainment device.

22. The system of attachment points for a vehicle seatback of claim 18, wherein the module comprises a load floor assembly.

23. The system of attachment points for a vehicle seatback of claim 18, wherein the module comprises a panel and strap assembly.

24. The system of attachment points for a vehicle seatback of claim 17, wherein the attachment member comprises an insert and wherein the insert includes one projection.

25. The system of attachment points for a vehicle seatback of claim 17, wherein the attachment member comprises an insert and wherein the insert includes a plurality of projections.

26. The system of attachment points for a vehicle seatback of claim 17, wherein the attachment member comprises a first insert and a second insert, wherein the frame assembly comprises a first bracket and a second bracket, wherein the first insert is attached to the first bracket, and wherein the second insert is attached to the second bracket.

27. The system of attachment points for a vehicle facing surface of a vehicle seatback of claim 17, wherein the vehicle facing surface includes the cover.

\* \* \* \* \*